United States Patent [19]
Hopper

[11] 3,986,291
[45] Oct. 19, 1976

[54] FISHING LURE

[76] Inventor: James H. Hopper, One Taylor Road, Hazardville Station, Enfield, Conn. 06082

[22] Filed: Mar. 28, 1975

[21] Appl. No.: 562,889

[52] U.S. Cl............................. 43/42.06; 43/42.09; 43/42.1; 43/42.28
[51] Int. Cl.² ......................................... A01K 85/00
[58] Field of Search............ 43/42.06, 42.09, 42.1, 43/42.28, 42.4, 42.41, 42.37, 42.38

[56] References Cited
UNITED STATES PATENTS

| | | | |
|---|---|---|---|
| 994,927 | 6/1911 | Jefferson | 43/42.1 |
| 2,027,069 | 1/1936 | Sorenson | 43/42.06 |
| 2,261,549 | 11/1941 | Hayes | 43/42.06 |
| 3,883,979 | 5/1975 | Williams, Jr. | 43/42.09 |

Primary Examiner—Warner H. Camp
Attorney, Agent, or Firm—Melvin A. Crosby

[57] ABSTRACT

A fishing lure in which a weight member has an eye at one end for connection to a leader or a line and a hook swivelly connected to the other end. A sleeve element of rubber-like material is closely fitted around the weight and extends rearwardly therealong and beyond the hook and is slit axially from the rear end forwardly a certain distance. Holes in the side of the sleeve toward the rear of the weight permit water to enter the sleeve and cause the slit rearward end of the sleeve to take active motion when the fishing lure is drawn through the water.

8 Claims, 4 Drawing Figures

U.S. Patent    Oct. 19, 1976    3,986,291
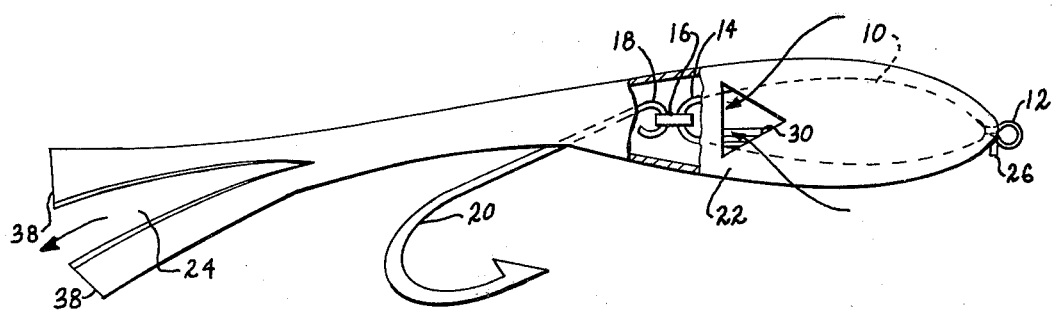
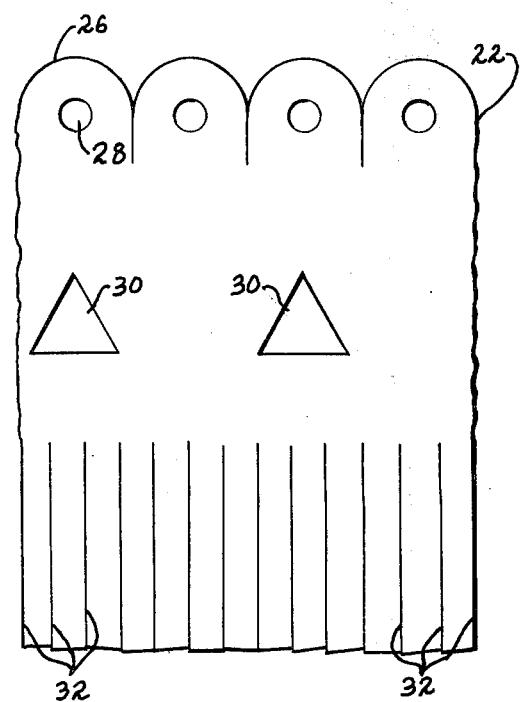
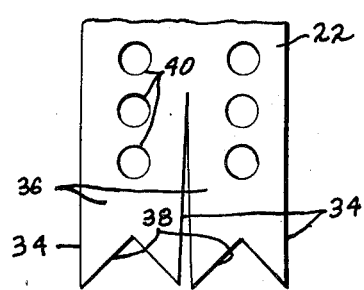
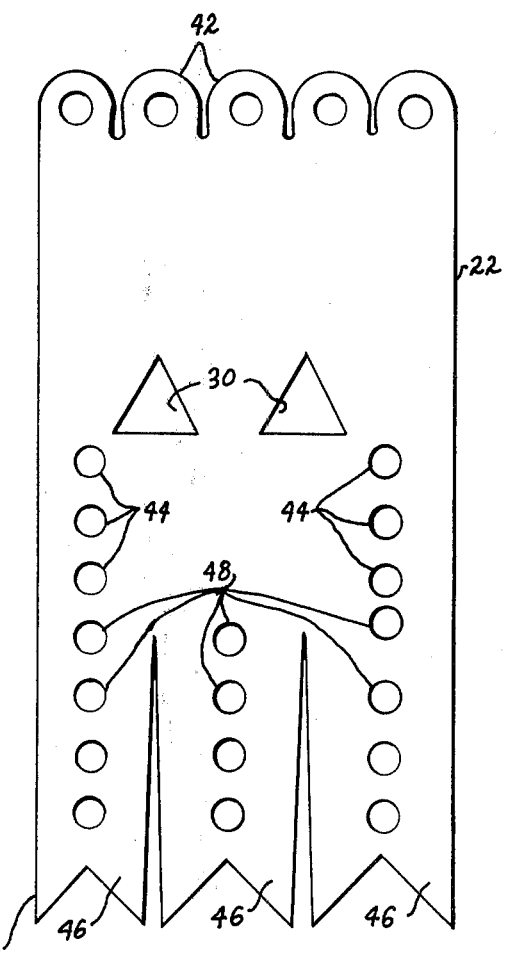

FISHING LURE

The present invention relates to fishing lures and is particularly concerned with a relatively inexpensive fishing lure which is characterized in being highly active when in the water.

An object of the present invention is the provision of a fishing lure which is inexpensive to manufacture and which can be made in a variety of sizes and which is particularly active when drawn through the water.

BRIEF SUMMARY OF THE INVENTION

According to the present invention a relatively elongated weight, which may be formed of lead, has an eye at one end for connection of the weight to a line or leader and an eye at the opposite end to which a hook is swivelly connected. A rubber-like sleeve is provided which surrounds the weight and extends rearwardly therealong to beyond the hook.

The sleeve has apertured tabs that are received over the eye at the forward end of the weight and the sleeve preferably closely embraces the weight. The rearward end of the sleeve is split to provide a tail portion for the fishing lure and holes formed in the sleeve near the rearward end of the weight permit water to flow through the rearward part of the sleeve and agitate the split rearward end of the sleeve whereby when the fishing lure is drawn through the water it simulates the action of a fish swimming in the water whereby the fishing lure becomes attractive to game fish.

The objects and advantages of the present invention will become more apparent upon reference to the following detailed specification taken in connection with the accompanying drawings in which:

FIG. 1 is a side view partly broken away showing a fishing lure according to the present invention.

FIG. 2 is a developed view of one form which the sleeve of the fishing lure can take.

FIG. 3 is a fragmentary view showing a different manner of forming the trailing or rearward end of the sleeve.

FIG. 4 is a developed view of another type sleeve for the fishing lure.

DETAILED DESCRIPTION OF THE INVENTION

Referring to the drawings somewhat more in detail, the fishing lure shown in FIG. 1 comprises a weight 10 which may be formed of lead or a lead alloy, for example. At the forward end of weight 10 is an eye 12 which may be cast directly into the weight 10 so as to be rigid therewith. A further eye 14 is provided at the rearward end of the weight and this may be linked with a ring 16 which is connected with loop 18 on the end of hook 20.

A sleeve element 22 of flexible rubber-like material is provided which surrounds the weight and fits relatively tightly thereon and which projects rearwardly from the rearward end of the weight a substantial distance beyond the barbed point end of hook 20. The sleeve 22 may be in the form of a tubular element, such as may be cut from a bicycle inner tube, for example, or which may be in the form of a flat sheet wrapped around the weight and hook as will be explained hereinafter.

The sleeve 22 is split inwardly from the rear end as indicated at 24 in FIG. 1 and the hook 20 is entrained through a hole provided in the sleeve element. At the forward end of the fishing lure, the sleeve element has apertured tabs 26 which fit over eye 12.

As will be seen in FIG. 2, which is a developed view of a typical sleeve element, the tabs 26 have the apertures 28 therein that fit over eye 12. Toward the rear end of weight 10, the sleeve is provided with apertures 30 through which water flows when the fishing lure is drawn through the water and the water will agitate the split rearward end of the sleeve and thereby simulate swimming fish.

The sleeve element in FIG. 2 has the rearward end split by a plurality of axial incisions 32 whereas the sleeve element of FIG. 1, and which is shown in developed view in FIG. 3, has a pair of incisions 34 extending forwardly from the rear end thus dividing the rear end into two parts 36, each of which may be notched inwardly from the free end as illustrated in FIG. 3.

The holes for receiving hook 20 are shown at 40 in FIG. 3 and the hook 20 may be entrained through a suitable hole or even through more than one hole if so desired. When entrained through the proper hole, the hook depends from the underneath side of the fishing lure as shown in FIG. 1 in an ideal position to hook a fish taking the lure. The hook may, of course, be baited if desired.

FIG. 4 shows a developed view of a sleeve which is in the form of a flat member which is wrapped around the weight 10. In this modification, in addition to the apertured tabs 42 at the forward end of the sleeve, the sleeve has further apertures as at 44 adjacent the rearward end of the weight which are snapped over eye 14 thereby holding the sleeve about the weight 10.

The rearward end of the sleeve of FIG. 4 is provided with two incisions dividing it into three parts 46 having holes 48 therein and when the sleeve is wrapped about the weight the parts 46 are disposed in superposed relation and the hook may be entrained through two of the parts 46 leaving the third part free.

As in the case of the other modifications, apertures in the side of the sleeve provide for flow of water rearwardly therethrough to provide action at the tail region of the sleeve.

It will be understood that the member to which the line and hook are connected does not necessarily have to be formed of metal. It is possible to utilize a light plastic material or wood in order to form a surface lure, or to use a somewhat heavier plastic to form a lure which will run under the surface of the water while using a metal, such as lead for example, when it is desired for the lure to sink substantially lower in the body of water. The lure is, thus, readily adaptable to surface fishing, to surf fishing and to deep water fishing.

It will also be understood that the lure could be made in a number of different sizes from quite small to large and all thereof will have the common characteristic of the flexible envelope through which water passes and which causes the tail section of the envelope to be active while the lure is being used.

Modifications may be made within the scope of the appended claims.

What is claimed is:

1. In a fishing lure; a weight having forward and rearward ends and an eye means protruding from the forward end for connection to a leader and having a hook swivelly connected to the rearward end, and a sleeve element formed of flexible rubber-like material extending in the fore and aft direction and at the forward end having apertured tabs receivable over said eye means, said element telescoping over said weight and hook and extending rearwardly to beyond the free end of the hook, said weight having a greatest diameter region and said element closely embracing said greatest diameter region of said weight, at least one aperture in the side of the sleeve element near the rearward end of the weight for admitting a stream of water into the inside of said sleeve element rearwardly of said weight as the lure moves in the water, and the rearward end of the sleeve element having spaced longitudinal slits therein forming strips at the rearward end of the sleeve element which move as a stream of water entering said aperture flows rearwardly out of the slitted end of said sleeve element.

2. A fishing lure according to claim 1 in which the aperture in the sleeve element is located axially between the greatest diameter portion of the weight and the point of connection thereto of said hook.

3. A fishing lure according to claim 1 in which the slit rearward end of the sleeve element has a plurality of closely spaced longitudinally extending parallel slits therein extending forwardly in said sleeve element from the rearward end thereof.

4. A fishing lure according to claim 1 in which the slit rearward end of the sleeve element has a pair of diametrally opposite longitudinal slits therein extending forwardly in said sleeve element from the rearward end thereof.

5. A fishing lure according to claim 1 in which the slit rearward end of the sleeve element has a pair of diametrally opposite slits therein and apertures laterally between the slits into which the barbed end of the hook can be introduced.

6. A fishing lure according to claim 1 in which said weight has a specific gravity less than that of water.

7. A fishing lure according to claim 1 in which said weight has a specific gravity at least equal to that of water.

8. A fishing lure according to claim 1 in which said weight has a specific gravity greater than that of water.

* * * * *